C. E. Albright,

Manger.

No. 103,956.  Patented June 7, 1870.

WITNESSES

INVENTOR
Chester E. Albright

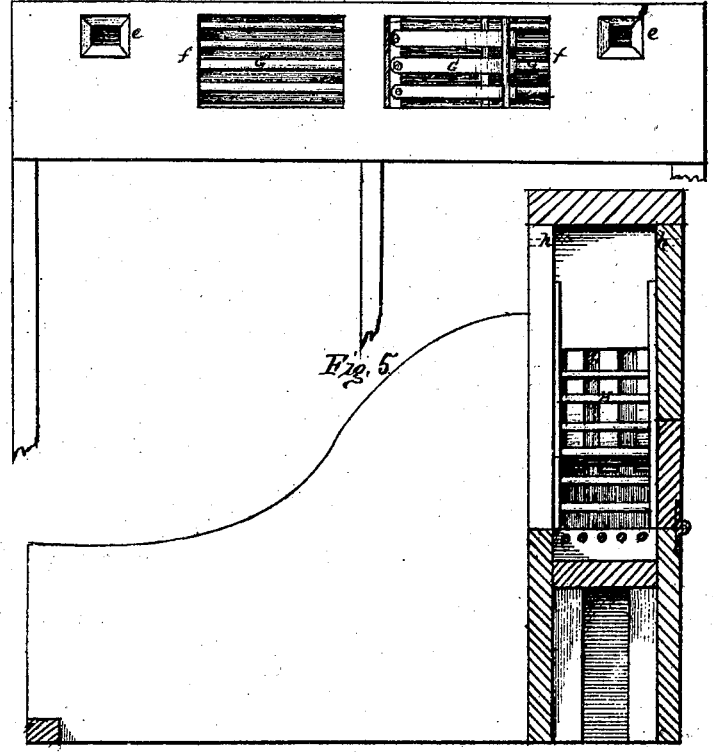

United States Patent Office.

CHESTER E. ALBRIGHT, OF MUNCY, PENNSYLVANIA.

Letters Patent No. 103,956, dated June 7, 1870.

IMPROVEMENT IN MANGERS.

The Schedule referred to in these Letters Patent and making part of the same.

*To all whom it may concern:*

Be it known that I, CHESTER E. ALBRIGHT, of Muncy, in the county of Lycoming and State of Pennsylvania, have invented a new and useful Improvement in Mangers; and I do hereby declare that the following is a full, clear, and exact description thereof, reference being had to the accompanying drawing and the letters of reference marked thereon.

The nature of my invention consists—

First, in locating and arranging the hay-manger and grain-feeding box side by side between two parallel partition-walls across the front of the stall, and providing a vertical rack in the side of the hay-manger facing the grain-box, through which rack the horse draws his hay.

Second, in providing said hay-manger with a grated bottom, not lower than the bottom of the grain-box, with a space below said grated bottom, into which any loose dirt in the hay will fall as the horse feeds.

Third, in so hanging said vertical feeding-rack by hinges at its upper end that it will easily swing inward toward the hay in the manger on pressure being applied to the opposite side, and will automatically resume its vertical position when the pressure is removed.

Fourth, in providing the hay-manger with a movable hinged back, which, by means of a spring, or a pulley and weight, will press the hay forward against the feeding-rack.

In feeding from mangers as usually constructed, the horse wastes a considerable portion of his grain by moving his head from side to side, beyond the edge of the grain-box or trough, while feeding, and so dropping a portion of the grain on the floor, or outside of the feeding-box or trough. In my arrangement, however, the grain feeding-box is surrounded on three sides by vertical walls rising to the top of the stall, so that the horse cannot move his head in front or on either side beyond the edge of the grain-box, and cannot well move his head beyond the edges of the said box on the open side next to him without stepping back in the stall, which he is not liable to do while feeding, and therefore any grain that may fall from the horse's mouth will drop back into the grain-box.

In feeding from an inclined rack, located in front of him, in the usual manner, the horse not only has to stretch out his head into an unnatural and uncomfortable position, but all the loose dirt and seed are drawn through the rack, and that which is not eaten by the horse with his hay falls down into his mane and fills the atmosphere which he breathes with a fine dust very injurious to his health.

In a manger constructed and arranged according to my invention, however, the horse draws his hay from the rack by simply turning his head to one side, which he does easily, and most of the loose dirt and seed will fall through the grated bottom of the hay-manger, into a space or receptacle below it, while even that which may be drawn through the rack with the hay can no part of it fall upon the horse and foul his mane.

In the accompanying drawing—

Figure 3 is a view of said back wall, as seen from the room in front of the stalls.

Figure 4 is a view, from above, of the floor which covers the hay-manger and grain-box.

Figure 5 is a side view of a section on line $x\,x$, fig. 1.

Figure 1:
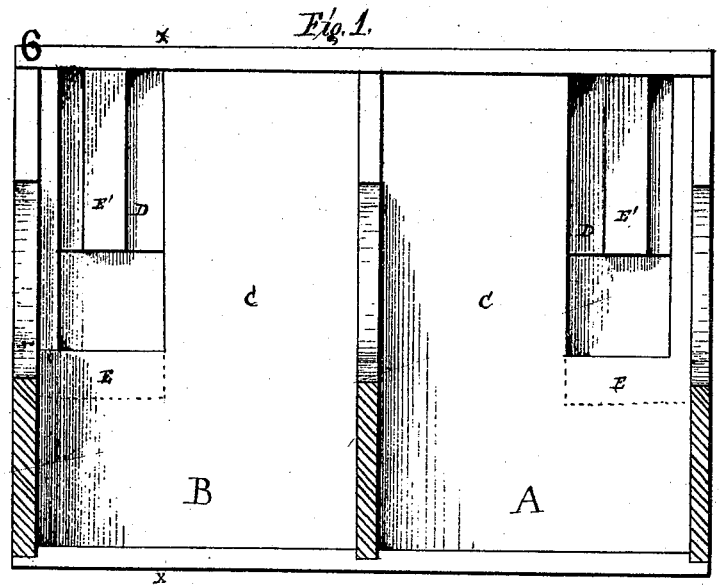
Figure 1 is a view of two stalls, as seen from a point directly in their rear, and shows the partition wall which divides the hay-mangers and grain-feeding boxes from the stalls.
Figure 2:
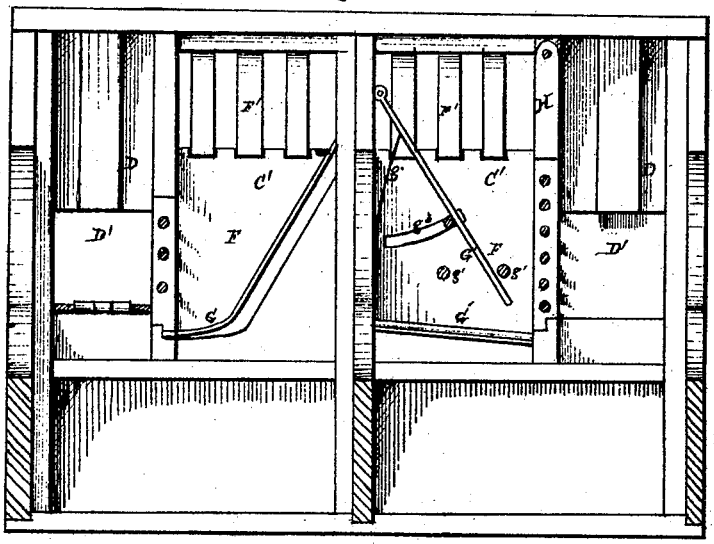
Figure 2 is a similar view of the back wall, which incloses the hay-mangers and grain-boxes, the front wall being removed to show the interior structure.

Two modifications of my invention are represented in the drawing, one of which is shown in the stall marked A, and the other in the stall marked B. In said stall A, sundry devices are shown, not absolutely necessary to secure what I deem the main advantages of my invention.

I will first proceed to describe the modification shown in stall A.

C is the partition-wall between the hay-manger and grain-box and the stall, and C' is the back wall, inclosing said manger and grain-box;

D is an opening in the partition wall C, extending from the grain-box up to the floor or ceiling above;

D' is a door in the back wall C', through which grain may be deposited in the feeding box from an adjoining room in front of the stalls;

E is the grain-feeding box, shown by dotted lines in fig. 1;

E' is a spout through which grain may be deposited in the feeding-box from the floor above, through the aperture shown at $e$, fig. 4;

F is the hay-manger;

F', a hanging-rack or grated door hinged, at its top, to the back partition wall, and opening by swinging inward, to admit of hay being fed into the manger from an adjoining room, and to prevent the hay from falling out at said opening when fed down from the floor above; and $f$, fig. 4, is an opening in the floor above to admit of hay being fed down from said floor into the manger.

G is a grated bottom of the hay-manger, on a level with or not below the bottom of the grain-box.

G' is a grated swinging back of the hay-manger, hinged at the top, and is kept pressed up against the hay by means of a spring, $g$, or by a pulley and weight.

$g^1\,g^1$ are holes through the partition-walls, through which a cross-bar may be inserted, to limit the forward movement of the swinging back G', and the backward movement of the feeding-rack H.

Across said swinging back another cross-bar, $g^2$, is attached to it, one end of which protrudes through a curved slot, $g^3$, in the back wall, and may be held in different positions by a pawl, $g^4$.

H, fig. 5, is the rack through which the horse feeds. It is vertical, has bars running crosswise, and is located at one side of the grain-box, facing the same.

It is hung by hinges, $h$, at the top, so that it will easily swing inward toward the hay in the manger by pressure on the other side, and is so hinged that it will, by its own weight, swing back to a vertical position when the pressure is removed, or it may be made to resume its vertical position by means of a spring or pulley and weight. This enables the horse, in feeding, to push the rack back against the hay, if necessary to reach it, and, as the rack maintains its vertical position when not so pushed back, it prevents the horse, while eating his grain, from dropping any of it over the hay-manger.

The modification shown in stall B is, in all respects, like that above described, except that the back of the hay-manger G' and the feeding-rack H are both permanently fixed in position, and not hinged.

In each modification there is a space, K, under the hay-manger, into which any seed or dirt falling from the hay as the horse feeds will fall. By this arrangement, the horse in feeding not only sifts or screens his own hay, but the seed, instead of falling down into his mane and upon the stable floor, is saved for any use to which it may be applicable.

It is important that the grated bottom of the hay-manger should be at least as high as the bottom of the grain-box, for otherwise it would become covered with hay which the horse in feeding would not move, and which would prevent the dirt and seed from falling through the grated bottom.

It will be seen that the upper part of the feeding-rack H is made solid or close like a door, the slatted portion extending up only as high as a point from which it will be convenient for the horse to feed. This I deem important, as, if open or slatted all the way to the top, more or less dirt and seed would be liable to fall down and lodge in the horse's mane.

Having thus fully described my invention, and the several modes of carrying it into effect,

What I claim, and desire to secure by Letters Patent, is—

1. The arrangement of the hay-manger and grain-feeding box side by side, as described, in combination with a vertical feeding-rack in that side of the hay-manger facing the grain-box, substantially as herein set forth.

2. The grated or slatted bottom of the hay-manger, located on or above a level with the bottom of the grain-box, substantially as and for the purpose described.

3. The vertical hinged feeding-rack, substantially as and for the purpose described.

4. The movable hinged back of the hay-manger G', substantially as and for the purpose set forth.

5. In combination with a hay-manger provided with openings to feed in hay from an adjoining room or from the floor above, the swinging door F', substantially as and for the purpose described.

CHESTER E. ALBRIGHT.

Witnesses:
Jos. L. Coombs,
J. J. Coombs.